Sept. 30, 1924.  R. G. KAPING  1,510,324
ICE MAKING APPARATUS
Filed Nov. 23, 1921  3 Sheets-Sheet 1

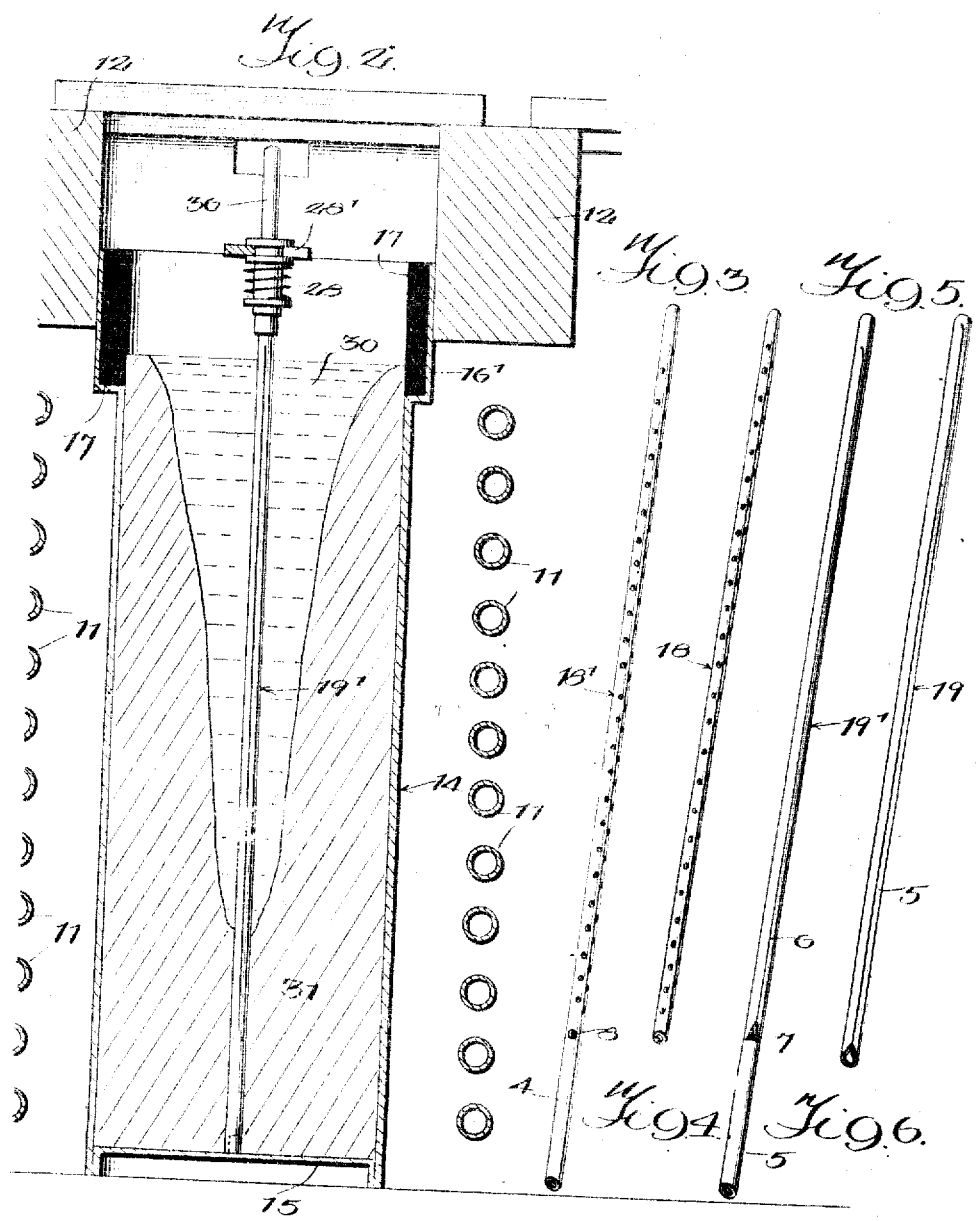

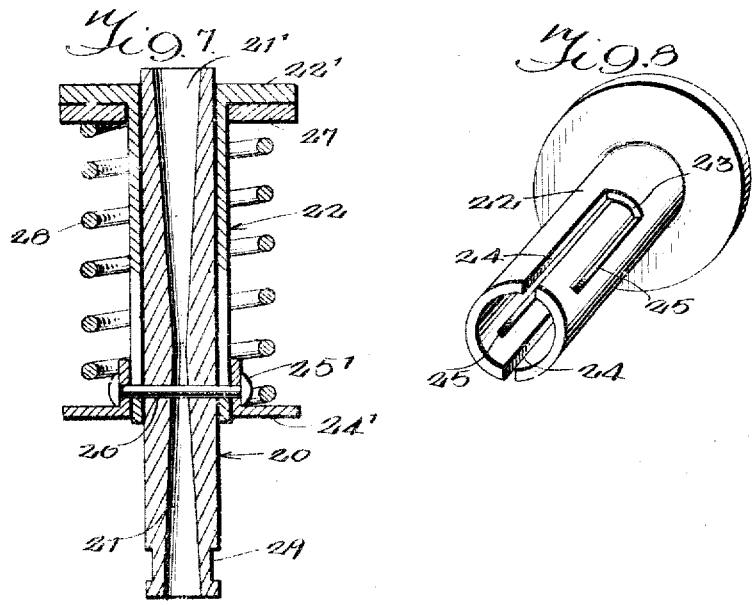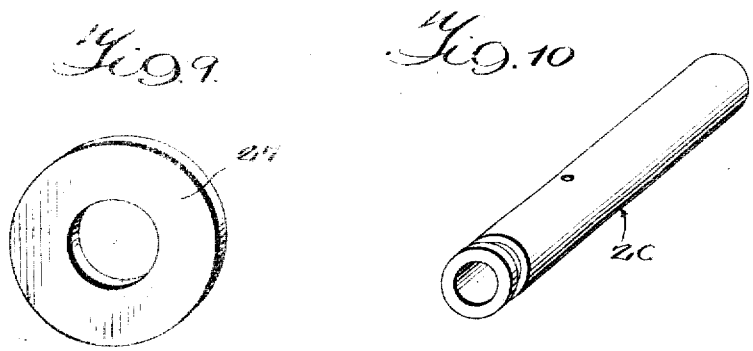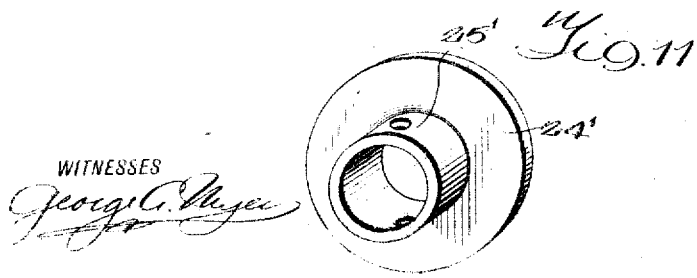

Patented Sept. 30, 1924.

1,510,324

UNITED STATES PATENT OFFICE.

RUDOLPH GEO. KAPING, OF CHICAGO, ILLINOIS.

ICE-MAKING APPARATUS.

Application filed November 23, 1921. Serial No. 517,402.

*To all whom it may concern:*

Be it known that I, RUDOLPH GEORGE KAPING, a citizen of the United States, and a resident of Chicago, in the county of Cook and State of Illinois, have invented certain new and useful Improvements in Ice-Making Apparatus, of which the following is a specification.

This invention relates to ice making apparatus.

The object of the invention is to provide a novel means for introducing air into containers or molds such as used in ice making apparatus whereby the water therein may be properly agitated during freezing and the impurities thoroughly expelled from the water and a high quality of artificial ice produced.

It is also an object of the invention that the impurities expelled from the water during the freezing period will not be frozen as a part of the ice cake formed.

A further object of the invention is to provide means whereby the tubes may be easily attached or connected with a compressed air supply.

Other objects and advantages relating to details of construction, combination and arrangement of parts will hereinafter appear in the detailed description to follow.

The invention is illustrated by way of example in the accompanying drawings, in which, Figure 1 is a fragmentary vertical sectional view of a portion of an ice making apparatus and showing an ice mold of the present invention and also the air introducing means therefor, the section being taken longitudinally of the ice mold.

Figure 2 is a view similar to Figure 1 but taken transversely of an ice mold.

Figures 3, 4, 5, and 6 are detail perspective views of different forms of tubes for introducing air into ice molds.

Figure 7 is a vertical sectional view of the tube holding or retaining means provided for each ice mold.

Figures 8, 9, 10 and 11 are detail perspective views of the parts comprising the holder shown in Figure 7.

Figure 1:
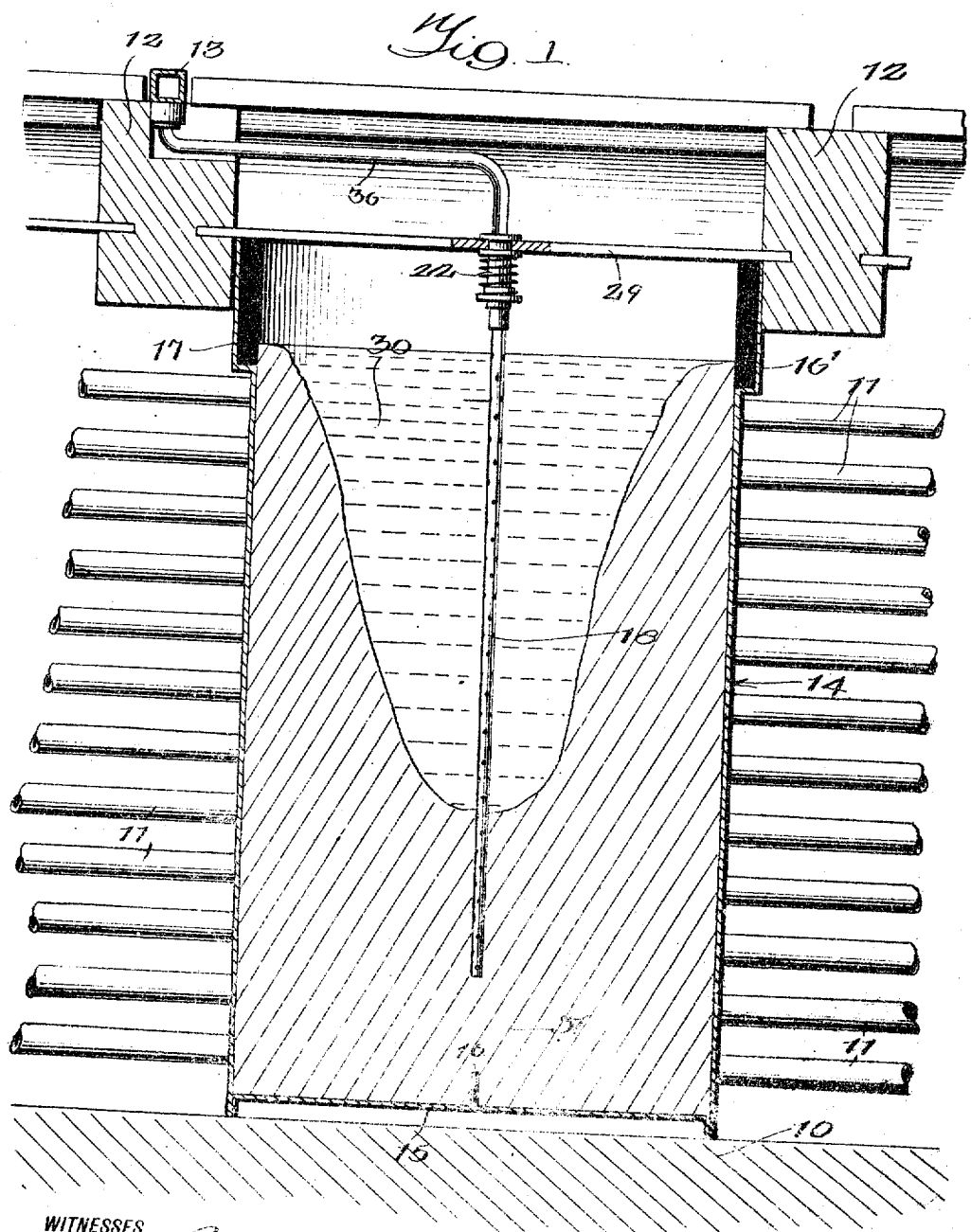

Referring to the drawings in detail 10 indicates the bottom of a freezing tank of an ice making apparatus, 11 the usual cooling tubes, 12 the cross supports at the top of the tank and 13 the air supply pipe for agitating the water in the different molds or containers during the freezing period.

As is well known a number of molds or containers are positioned in the freezing tank and each filled with water preparatory to freezing.

In the present instance I have provided a novel form of mold or container generally indicated by the reference numeral 14 which may be of any shape desired, preferably rectangular in cross section as shown, and made of light sheet metal. The bottom 15 is slightly pressed upward as seen in Figures 1 and 2 and provided with a central stud 16, the purpose of which will later be made apparent.

The upper end portion 16' of the mold 14 is enlarged and within the enlargement there is positioned a filler 17. The inner dimensions of the filler corresponds to the inner dimensions of the lower end of the mold, and said filler being of a material non-conductive to heat.

For introducing air into each mold or container 14 I provide the different types of tubes as shown in Figures 3 to 6 inclusive. The tubes in each instance are made of paper which is properly treated to make the same impervious to water. The tube 18, shown in Figure 4, is perforated substantially its entire length as indicated. The tube 18' shown in Figure 3 differs from the tube 18 in that it is slightly longer and its lower end portion 4 is without perforations. Also it may be well to state that in each instance the perforations end slightly below the upper end of the tube. The tube 19, shown in Figure 6, is provided with a seam 5 which extends substantially the length thereof and the tube 19' shown in Figure 5 is similar to the tube 19 but of greater length and its seam 6 terminating at its lower end in an opening 7. Also it may be observed that in the case of the tubes 18' shown in Figure 3 at the point where the perforations terminate an enlarged opening 8 is provided.

In Figure 1 the tube extending into the container is of the type shown in Figure 4 and referred to by the reference numeral 18 while in Figure 2 the type of tube is of that shown in Figure 5 and referred to by the reference numeral 19'. The manner in which these tubes introduce the air into the molds during the freezing period and the advantages obtained thereby will later be given.

In order to properly support the air introducing tube in the different molds 14 I provide a holding and coupling means therefor. This holding and coupling means is shown in detail in Figures 7 to 11 inclusive and comprises a tubular member 20, the bore of which tapers from each of its ends toward its longitudinal center and thus providing the two tapering passages 21 and 21'. The tubular member 20 is positioned within a sleeve 22, said sleeve having formed at its one end a collar 22' and also provided with a pair of U-shaped slots 23, the one lug 24 of each slot terminating at the lower end of the sleeve while the other lug 25 of each slot is closed at its outer end as shown. Encircling the lower end of the sleeve 22 is a collar 25' which has formed therewith a retaining flange 24' and extending through the tubular member 20 is a pin 26, said pin having its ends disposed in the leg portions 25 of the U-shaped slots 23 and also having its end secured to the collar 25 as best shown in Figure 7. As is obvious by this construction the sleeve 22 is free to move upward and downward with respect to the tubular member 20. Also the sleeve carries at its upper end a washer plate 27 and between said washer plate and the retaining flange 24' is interposed a coiled spring 28.

In using the tube holder just described, the same is positioned as shown in Figures 1 and 2. The cross member 29 for each mold is provided with a suitable notch or insert as at 28' (Figure 2) and of sufficient width to receive the sleeve 22 of the holder. The collar 27 is pressed downwardly against the tension of the spring 28 and in this manner the holder is positioned. As is obvious the spring 28 will continue to press the collar 27 upwardly and draw the sleeve 22 downwardly and in this way clamp the holder to the cross member 19.

When it is desired to use the form of tube 18 as shown in Figure 1, the same is inserted in the lower end of the tube 20 and due to the tapering of the passage 21 the tube will be frictionally held against movement. Also the tube will be retained in this position by being pressed upwardly by the water within the mold.

Should it be desired to connect the air introducing tube 18 with the tubular members 20 by hose, I provide a groove 29 in the lower end of the tubular member 20 to give the hose a gripping action to the tubular member 20.

When using a longer tube of the type shown in Figures 3 and 5, the same is positioned as shown in Figure 2 of the drawings.

In this instance the upper end of the tube is inserted within the tapering passage 21 of the tubular member 20 and its lower end telescopes the stud 16 in the bottom of the mold.

As shown in Figure 7 the tubular member 20 extends slightly above the collar 22' of the sleeve 22 and which is telescoped by a suitable pipe 36 which is connected at its other end with the air supply pipe 13. This connection may be made by a flexible hose if so desired.

It is thought from the foregoing description that the manner of supporting the different types of air introducing tubes and connecting the same with the source of compressed air supply may be clearly understood without further explanation. A tube may be quickly positioned and be held in a reliable manner.

In preparing for making ice, the molds or containers 14 are of course filled with water, preferably filtered raw or filtered undistilled water, and then an air tube of the proper type may be positioned and the freezing operation then begun. The water will freeze in the bottom and sides of the mold and preferably the lower end of the air introducing pipe is spaced from the bottom of the mold as shown. The water indicated at 30 will solidify to produce a formation of ice similar to that shown at 31. The air will be introduced into the water by the tube and will escape from the lower end thereof. The air will properly agitate the water and drive upward the impurities therein. When the ice freezes about the lower end of the air introducing tube, if a perforated tube is used, then the air will escape from the perforations with greater force than would be the case if escaping from the lower end of the tube. Should a seamed tube be used, the air will escape first from the lower end of the tube until the ice is formed thereabout and then the seam will open and thus allow the air to escape directly above the formation of ice. In either instance the air escaping will aid to lift the impurities to the top of the mold and maintain the water in the proper state of agitation.

When the water in the mold is frozen to the level of the enalrgement 16' the impurities will exist above the ice and surrounded by the insulation 17 which will prevent the freezing thereof and thus when the ice is removed from the mold a crystal and clear block of ice will be produced.

It is of course apparent that the air introducing tubes used will remain in the cake of ice. However, by not removing the tube to substitute shorter ones as is the usual custom as the freezing progresses upward in the mold any possibility of trapping air in the cake of ice is avoided and likewise any possibility of trapping impurities is avoided and with the result of a high quality of ice.

While I have shown and described the preferred form of my invention it is to be understood that I am aware of the fact that changes in form, combination and arrangement of parts may be made by those skilled in the art without departing from the spirit of the invention as indicated by the appended claims.

What I claim is:

1. In an ice making apparatus, a liquid freezing container having its upper and interior end portion provided with insulation lining.

2. In an ice making apparatus, a container or mold, a tubular member depending therein, said tubular member being readily frangible along a line extending longitudinally thereof and being adapted for connection at its upper end with a source of air pressure.

3. In an ice making apparatus, a container or mold for freezing liquid depending therein, a paper tubular member having an easily separable seam extending longitudinally thereof and said tube being adapted to be connected to a source of air pressure arranged in the mold for introducing air into said mold when said mold is filled with water, and said seam being adapted to open so that the air will be automatically and progressively introduced into said mold or container in close proximity to the surrounding formation of ice as the same progresses upwardly.

4. In an ice making apparatus, a container or mold, a paper tube depending therein, said tube having a lateral opening adjacent to the lower end thereof and being readily frangible along a line extending from said opening longitudinally of the tube toward the upper end thereof, said tube being adapted for connection at its upper end with a source of air pressure.

5. In an ice making apparatus of the character described, a container or mold for freezing liquid, a tube depending therein and having a seam adapted to open upon slight pressure upon the exterior of said tube, said seam extending longitudinally of the tube and said tube being adapted to be arranged in the mold so that the same may be connected to a source of air pressure and employed for introducing air into said mold when said mold is filled with water and said seam adapted to automatically and progressively maintain the introduction of air in close proximity to the surrounding ice in said mold as the same progresses upwardly.

6. An air introducing means for ice making molds comprising a tubular member with an easily separable seam extending longitudinally thereof.

7. An air introducing means for ice making molds comprising a tubular member having an easily separable seam extending longitudinally thereof and terminating adjacent one end in a laterally extending opening for the purpose described.

8. In an ice making apparatus of the character described, a container or mold, a tubular member made of frangible material and perforated throughout its length, said tubular member being adapted to be arranged in the mold to extend longitudinally of said mold, and also adapted to be connected to a source of air pressure and employed for introducing air into said mold when the same is filled with water and automatically maintain the point of introduction of the air into said mold in close proximity to the ice formation as the same progresses upwardly.

9. In an ice making apparatus of the character described, a mold or container for freezing liquid, a stud extending upwardly from the bottom of said container, a cross support at the upper end of the container, a depressible nipple carried by said cross support, and its one end adapted to be connected with a source of compressed air supply, and an air delivery tube adapted to be removably positioned between said stud and the lower end of said nipple.

10. In an ice making apparatus, a liquid freezing mold or container, a stud extending upwardly from the bottom thereof, a cross support for the top of said container, a sleeve extended through an opening in said cross support, a spring means whereby said sleeve may be clamped in position upon said cross support, and an air delivery tube adapted to be extended between the lower end of said sleeve and stud in the bottom of the container.

11. In an ice making apparatus, a mold, a cross support at the upper end of the mold, a sleeve supported by said cross support, a spring pressed collar to hold the sleeve in position upon said support, and a tubular member carried within the sleeve adapted to be moved longitudinally thereof, for the purpose described.

RUDOLPH GEO. KAPING.